(12) United States Patent
Anderson et al.

(10) Patent No.: US 6,170,053 B1
(45) Date of Patent: Jan. 2, 2001

(54) MICROPROCESSOR WITH CIRCUITS, SYSTEMS AND METHODS FOR RESPONDING TO BRANCH INSTRUCTIONS BASED ON HISTORY OF PREDICTION ACCURACY

(75) Inventors: Timothy D. Anderson; Simonjit Dutta, both of Dallas; Jonathan H. Shiell, Plano, all of TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 08/883,998

(22) Filed: Jun. 27, 1997

Related U.S. Application Data

(60) Provisional application No. 60/020,933, filed on Jun. 27, 1996.

(51) Int. Cl.⁷ .................................................. G06F 9/32
(52) U.S. Cl. ......................................................... 712/240
(58) Field of Search .................................. 395/587, 586; 712/240, 239

(56) References Cited

U.S. PATENT DOCUMENTS

| | | | |
|---|---|---|---|
| 5,553,253 | * | 9/1996 | Pan et al. ............................. 712/240 |
| 5,553,255 | * | 9/1996 | Jain et al. ............................ 712/235 |
| 5,687,360 | * | 11/1997 | Chang .................................. 712/240 |
| 5,724,563 | * | 3/1998 | Hasegawa ............................ 712/233 |
| 5,815,699 | * | 9/1998 | Puziol et al. ......................... 712/239 |
| 5,857,104 | * | 1/1999 | Natarjan et al. ........................ 717/5 |
| 5,864,697 | * | 1/1999 | Shiell .................................... 712/240 |
| 5,928,358 | * | 7/1999 | Takayama et al. .................. 712/239 |
| 5,944,817 | * | 8/1999 | Hoyt et al. ........................... 712/240 |
| 5,948,100 | * | 9/1999 | Hsu et al. ............................. 712/238 |

* cited by examiner

*Primary Examiner*—Kenneth R. Coulter
(74) *Attorney, Agent, or Firm*—Rebecca Mapstone Lake; Richard L. Donaldson

(57) ABSTRACT

A microprocessor with an execution stage (26) including a plurality of execution units and an instruction memory (32) for storing instructions. The microprocessor further includes circuitry for retrieving (14) instructions from the instruction memory. This retrieving circuitry may retrieve one instruction simultaneously with the execution of another instruction by one of the plurality of execution units. Further, this retrieving circuitry includes a branch target memory (30) for storing a plurality of information fields ($30_r$) corresponding to a branch instruction. The information fields include at least a target instruction address ($T_n$), a prediction field ($P_n$) indicating whether or not program flow should pass to the target instruction address, and an accuracy measure ($PPA_n$) indicating accuracy for past prediction fields. In operation, the circuitry for retrieving instructions retrieves (46), as a next instruction to follow the branch instruction, an instruction corresponding to the target instruction address in response to a function ($TP_n$) responsive to the accuracy measure exceeding a predetermined threshold and the prediction field indicating program flow should pass to the target instruction address. Additionally, the circuitry for retrieving instructions retrieves (54), in response to the function responsive to the accuracy measure not exceeding a predetermined threshold, a first group of instructions, wherein the first group of instructions is sequentially arranged after the branching branch instruction and includes an instruction corresponding to the target instruction address.

30 Claims, 4 Drawing Sheets

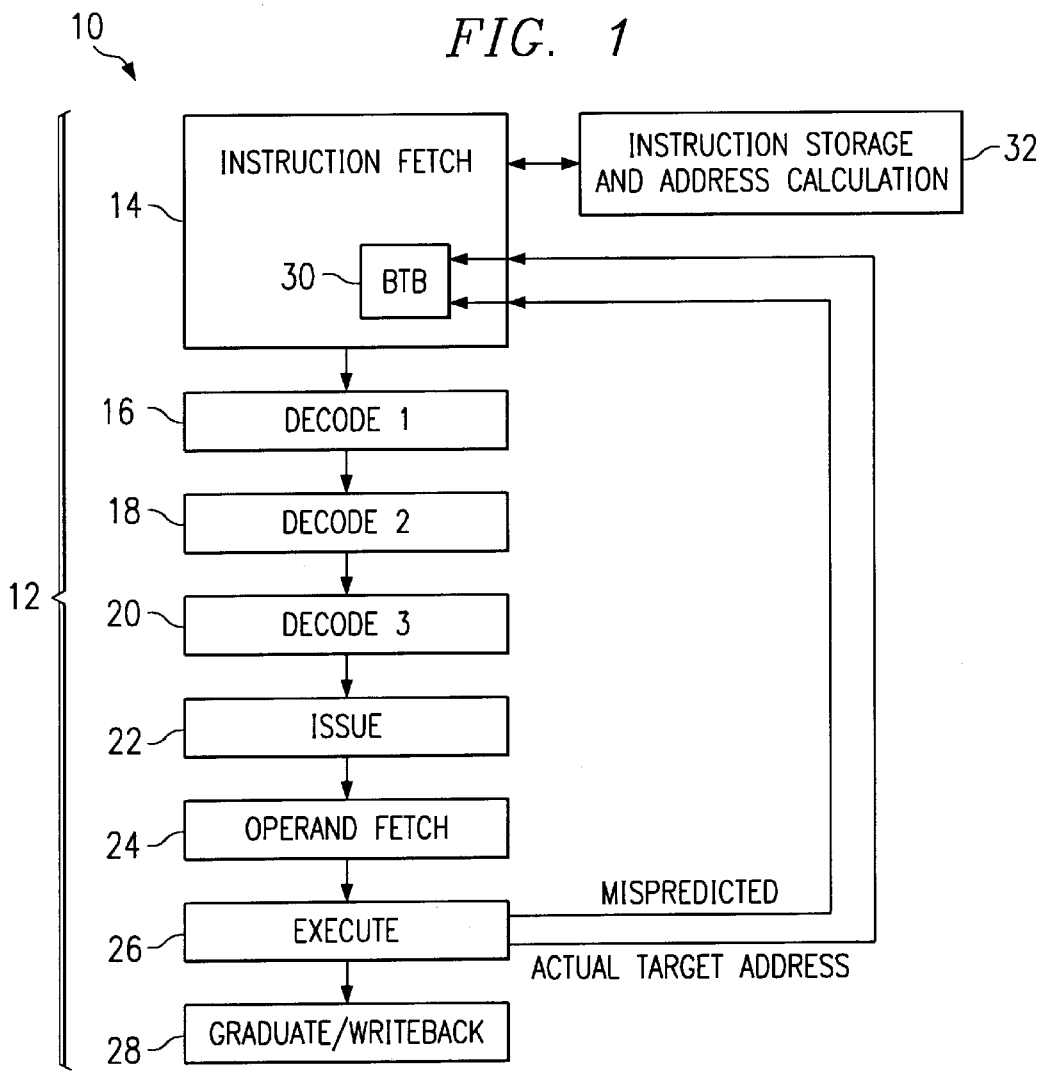

MICROPROCESSOR WITH CIRCUITS, SYSTEMS AND METHODS FOR RESPONDING TO BRANCH INSTRUCTIONS BASED ON HISTORY OF PREDICTION ACCURACY

This application claims priority under 35 U.S.C. § 119 (e)(1) of provisional application number 60/020,933, filed Jun. 27, 1996.

TECHNICAL FIELD OF THE INVENTION

The present embodiments relate to microprocessor technology, and are more particularly directed to a microprocessor with circuits, systems, and methods for responding to branch instructions based on the history of past branch prediction accuracy.

BACKGROUND OF THE INVENTION

Significant advances have recently been made in the design of microprocessors to improve their performance, as measured by the number of instructions executed over a given time period. One such advance relates to microprocessors of the "superscalar" type, which can accomplish parallel instruction completion with a single instruction pointer. Typically, superscalar microprocessors have multiple execution units, such as multiple integer arithmetic logic units (ALUs), multiple load/store units (LSUs), and a floating point unit (FPU), each of which is capable of executing a program instruction. As such, multiple machine instructions may be executed simultaneously in a superscalar microprocessor, providing obvious benefits in the overall performance of the device and its system application.

Another common technique used in modern microprocessors to improve performance involves the "pipelining" of instructions. As is well known in the art, microprocessor instructions each generally involve several sequential operations, such as instruction fetch, instruction decode, retrieval of operands from registers or memory, execution of the instruction, and writeback of the results of the instruction. Pipelining of instructions in a microprocessor refers to the staging of a sequence of instructions so that multiple instructions in the sequence are simultaneously processed at different stages in the internal sequence. For example, if a pipelined microprocessor is executing instruction n in a given microprocessor clock cycle, a four-stage pipelined microprocessor may simultaneously (i.e., in the same machine cycle) retrieve the operands for instruction n+1 (i.e., the next instruction in the sequence), decode instruction n+2, and fetch instruction n+3. Through the use of pipelining, the performance of the microprocessor can effectively execute a sequence of multiple-cycle instructions at a rate of one per clock cycle.

Through the use of both pipelining and superscalar techniques, modern microprocessors may execute multi-cycle machine instructions at a rate greater than one instruction per machine clock cycle, assuming that the instructions proceed in a known sequence. However, as is well known in the art, many computer programs do not continuously proceed in the sequential order of the instructions, but instead include branches (both conditional and unconditional) to program instructions that are not in the current sequence. Such operations challenge the pipelined microprocessor because an instruction in the pipeline may not necessarily reach execution. For example, a conditional branch instruction may, upon execution, cause a branch to an instruction other than the next sequential instruction currently in the pipeline. In this event, the instructions currently in the pipeline and following the branch instruction are not used. Instead, these successive instructions are "flushed" from the pipeline and the actual next instruction (i.e., the target of the branch) is fetched and processed through the pipeline (e.g., by decoding, execution, writeback and the like). Flushing in this manner, however, expends multiple machine clock cycles before execution of the actual target instruction occurs, and the intervening clock cycles required to re-fill the pipeline appear as idle cycles from the viewpoint of completed instructions.

The effects of the above-described non-sequential operation, and of the resulting pipeline flush, may be worsened in the case of superscalar pipelined microprocessors. If, for example, a branch or other interruption in the sequential instruction flow of the microprocessor occurs in such microprocessors, the number of lost pipeline slots, or lost execution opportunities, is multiplied by the number of parallel pipelines. The performance reduction due to branches and non-sequential program execution is therefore amplified in superscalar pipelined microprocessors.

In order to minimize microprocessor performance reduction which results from non-sequential program execution, many modern microprocessors incorporate speculative execution based upon branch prediction. Branch prediction predicts, on a statistical basis, the results of each conditional branch (i.e., whether the branch will be "taken" or "not-taken"), and the microprocessor continues fetching instructions and operating the pipeline based on the prediction. For example, if a branch instruction is predicted not taken, then the next instruction fetched into the pipeline is simply the next sequential instruction following the branch instruction. On the other hand, if a branch instruction is predicted taken, then the next instruction fetched into the pipeline is the target instruction (i.e., the instruction to which the branch goes if taken). The instructions fetched based upon such a prediction proceed along the pipeline until the actual result of the condition is determined (typically upon execution of the branch instruction). If the prediction is correct, the speculative execution of the predicted instructions maintains the microprocessor at its highest performance level through full utilization of the pipeline. In the event that the prediction is incorrect, the pipeline is "flushed" to remove all instructions following the branch instruction in the pipeline.

By way of further background, conventional speculative execution techniques include the use of branch target buffers (BTBs). Conventional BTBs are cache-like buffers commonly used in the fetch units of microprocessors. The BTB commonly stores at least three items: (1) an identifier of a previously performed branch instruction as a tag; (2) the target address for the branch (i.e., the address to which the branch points in its predicted taken state); and (3) an indication relating to the branch's actual history, that is, whether or not the branch was taken in past occurrences of the branch. The indication relating to the branch's actual history either directly indicates a prediction, or is used to derive a prediction, of whether the branch is taken. Once a BTB entry is written to include this information for a given branch, subsequent fetches of the same branch are handled using this very information. Specifically, if the branch is predicted taken (based on the branch history), the target address is used as the next address to fetch in the pipeline. The history section of the BTB entry is also updated upon execution of the branch instruction. Specifically, the execution unit determines the actual target address for the branch instruction to determine whether or not the branch is taken. This information updates the history in the BTB entry and, therefore, affects the future prediction for that entry. Note also that the actual target address from the execution unit is also compared to the predicted address; if the two do not match, a misprediction has occurred and the instruction unit is so informed so that the pipeline may be flushed and begin fetching new instructions beginning at the actual address.

While branch prediction techniques are, in general, beneficial in certain instances, mispredictions of branch execution still occur and may be very costly in terms of microprocessor efficiency. For example, as the pipelines of modern superscalar machines get deeper (i.e., hold more instructions at varying stages at once), and as such machines include a greater number of pipelines, a mispredicted branch may heavily penalize performance by requiring a pipeline or pipelines to be emptied and subsequently refilled with instructions from the correct target address. In this instance, numerous cycles are required to reset the pipeline(s) to an operational state and, thus, valuable processor cycle time is lost. Thus, while modern branch target buffer technology reduces the flush/refill penalty rate by often correctly predicting program flow past branches, the branch misprediction penalty that remains is one of the more serious impediments to realizing even higher processor performance.

In view of the above, there arises a need to address the drawbacks of the effects of mispredicted branches in a superscalar and/or pipelined microprocessor.

SUMMARY OF THE INVENTION

In one embodiment, there is a microprocessor with an execution stage including a plurality of execution units and an instruction memory for storing instructions. The microprocessor further includes circuitry for retrieving instructions from the instruction memory. This retrieving circuitry may retrieve one instruction simultaneously with the execution of another instruction by one of the plurality of execution units. Further, this retrieving circuitry includes a branch target memory for storing a plurality of information fields corresponding to a branch instruction. The information fields include at least a target instruction address, a prediction field indicating whether or not program flow should pass to the target instruction address, and an accuracy measure indicating accuracy of past indications by the prediction field. In operation, the circuitry for retrieving instructions retrieves, as a next instruction to follow the branch instruction, an instruction corresponding to the target instruction address in response to a function responsive to the accuracy measure exceeding a predetermined threshold and the prediction field indicating program flow should pass to the target instruction address. Additionally, the circuitry for retrieving instructions retrieves, in response to the function responsive to the accuracy measure not exceeding a predetermined threshold, a first group of instructions, wherein the first group of instructions is sequentially arranged after the branching branch instruction and includes an instruction corresponding to the target instruction address. Other circuits, systems, and methods are also disclosed and claimed.

BRIEF DESCRIPTION OF THE DRAWINGS

FIG. 1 illustrates a diagram of a microprocessor pipeline in accordance with the present embodiments;

FIG. 2 illustrates the contents of a line within a branch target buffer according to the preferred embodiment;

DETAILED DESCRIPTION OF THE PREFERRED EMBODIMENTS

Figure 3A:
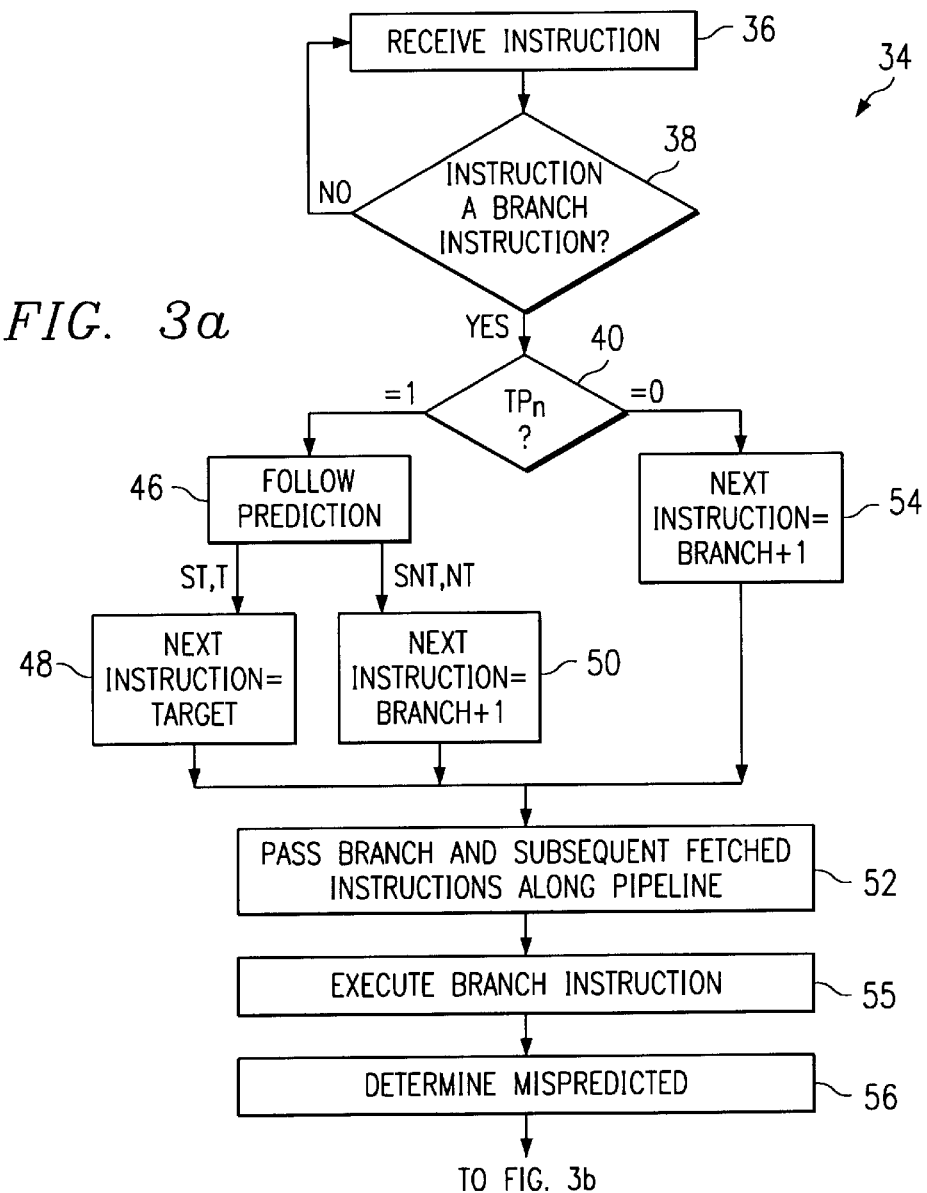
FIG. 3a illustrates a first portion of a method embodiment shown in a flowchart for instruction fetching, prediction, and predication in response to a branch instruction.

FIG. 1 illustrates an instruction processing system designated generally at 10 and which is used by way of example as the type of system in which the present embodiments may be incorporated. System 10 may be included in various types of microprocessors which may be modified to achieve the principles set forth below and, indeed, an example of such a microprocessor is shown in detail below in connection with FIG. 5. At this point, however, various details are deferred until later to simplify the discussion. Turning then to system 10, it includes a pipeline 12 which in certain respects is similar to the type commonly existing in the current art to receive and process instructions in a complex instruction set computer ("CISC"). Pipeline 12 is shown by way of example as having eight stages evenly numbered 14 through 28. Each of stages 14 through 28 is in many respects representative of a stage or stages known in the art, and may differ in name and/or function in different architectures. Generally, and as known in the art, a microprocessor pipeline includes a beginning stage, an ending stage, and a group of intermediary stages, where an instruction passes from the beginning toward the ending stage with one or more operations occurring in response to the instruction being at each stage. As detailed below, however, pipeline 12 greatly differs from the prior art at least insofar as instruction fetch stage 14 includes a branch target buffer ("BTB") 30 which, while including a prediction for a branch instruction, further includes additional information which may cause the prediction not to be followed and, instead, for an alternative action to be taken in response to the branch instruction with a combined performance increase over the prior art. Note also that BTB 30 is shown within stage 14 only by way of example and because of its functional relationship to the instruction fetching process; nevertheless, it may be a separate physical structure rather than as shown in FIG. 1. Before reaching a detailed discussion of the instruction fetching process, some generalizations are helpful to further appreciate the inventive scope of the present embodiments. Thus, the following discussion is by way of example and without limitation to the inventive embodiments discussed later.

Turning to pipeline 12, note generally that an instruction is retrieved at a beginning pipeline stage which in the present example is instruction fetch stage 14. Instruction fetching by stage 14 may occur from various resources such as caches and various levels of memory, and also may include address manipulation such as translation between a logical address and a physical address. Therefore, instruction fetch stage 14 is further shown connected to an instruction storage and address calculation circuit 32. Typically, the received instruction is thereafter decoded in one or more decode stages. While a pipeline may therefore include any integer number of decode stages, pipeline 12 includes three such stages 16 through 20 by way of example. Additionally, different teachings refer to these stages in different manners; for example, often these stages are broken down into so-called predecode stages followed by decode stages. In all events, the combination of stages 16 through 20 decompresses the more complicated instruction into one or more simple operations referred to in this document as micro-operation codes. These micro-operation codes typically may be executed in a single execution clock. Note also that micro-operation codes have different names depending on the architecture and/or manufacturer. For example, in the Texas Instruments' standard, micro-operation codes are referred to as atomic operations ("AOps"). These AOps, if completed in their entirety, represent completion and graduation of the instruction set instruction, including its opcode and operands if applicable. Note that AOps are approximately comparable to some RISC instructions and, thus, are the codes which are connected to various portions of the microprocessor to subsequently initiate execution of the decoded instruction. Thus, AOps are comparable to what is referred to in other architectures as ROps, $\mu$Ops, or RISC86 instructions.

After the micro-operation codes are generated from decode stages 16 through 20, stage 22 issues those codes to the corresponding appropriate execution units of the microprocessor. In some conventions, the issue stage is referred to as the scheduling of each micro-operation code to its execution unit. For example, if a microprocessor includes three execution units (e.g., an arithmetic unit, a load/store unit, and a floating point unit), then up to three micro-operation codes may be assigned for execution in a single clock cycle by each corresponding execution unit. Indeed, a microprocessor may include more than three execution units, such as by having more than one arithmetic unit and more than one load/store unit. In such an event, the number of micro-operation codes to be executed in a single clock cycle may be increased accordingly.

After the micro-operation codes are issued, stage 24 fetches any operands necessary to execute any one or more of the currently-issued micro-operation codes. Typically, this includes operands fetched from either registers or memory. Next, in stage 26, the micro-operation codes are executed, that is, each execution unit performs its corresponding functionality on its assigned micro-operation code. Note that execute stage 26 also provides two branch-related control signals to BTB 30. Specifically, and as detailed later, execute stage 26, upon executing a branch instruction, determines the actual (as opposed to the predicted) target address corresponding to the branch instruction; thus, this address is communicated to BTB 30 and is shown as the ACTUAL TARGET ADDRESS signal on FIG. 1. In addition, execute stage 26 further determines whether the ACTUAL TARGET ADDRESS for a given branch instruction matches the predicted target address for the same branch instruction. The result of this determination is passed to BTB 30 via the MISPREDICTED signal. In the preferred embodiment, the MISPREDICTED signal includes at least two bits, one bit for indicating whether the prediction is accurate and another bit for indicating whether the current MISPREDICTED signal is valid. Lastly, note that some architectures may actually provide either or both of these control signals from areas other than an execution unit or even before the execute stage. For example, some architectures may determine during decoding of an instruction that the instruction is not a branch instruction, yet it is predicted as taken. Naturally, a taken prediction of a non-branch instruction is inaccurate because the non-branch instruction by definition does not "take" a branch. Thus, this instance results in a misprediction even before the branch instruction reaches the execute stage. Other examples also will be ascertainable by a person skilled in the art. In all events, however, a person skilled in the art will be able to apply such other architectures to various of the inventive aspects described in this document. Completing pipeline 12, stage 28 graduates the instruction, meaning the instruction completes and take its effect, if any, on the architected state of the microprocessor. In addition, the result of the instruction, if any, may be written to some store such as a register file. This last operation is commonly referred to as writeback, and sometimes is considered a function which is not part of the final pipeline stage, but which occurs at the same time the instruction is graduated.

Before presenting a detailed discussion of the operation of system 10 of FIG. 1, FIG. 2 illustrates a single tag and associated entry $30_n$ in BTB 30, according to the present embodiment. Tag $T_n$ shown in FIG. 2 includes a logical address portion LA that is the address of a recently performed branch instruction, with tag $T_n$ preferably including an offset portion indicating the starting offset of the specific instruction within the instruction code line associated with logical address LA. Alternatively, physical addresses or any other type of address may be used as the tag in BTB 30, if desired. Entry $30_n$ has, associated with tag $T_n$, a data entry $D_n$ that corresponds to the target address of the branching instruction identified by tag $T_n$.

Following the data entry $D_n$ in entry $30_n$ is a history or prediction field $P_n$, which either directly indicates, or is used to derive an indication of, the predicted state of the branch instruction. To simplify the current discussion, the $P_n$ field of the following examples directly indicates the prediction for the corresponding branch instruction; however, by referring to a "prediction field" or "$P_n$" in this document, it is intended (unless stated otherwise) to include with the present embodiments any alternative where the prediction is either directly indicated by the field, or is further derived from this field, such as by using information from the field to address a secondary table or the like which further stores the actual prediction. Thus, a person skilled in the art may apply the present embodiments to alternative prediction formats and techniques. Returning then to $P_n$, note that it could include one or more additional bits, such as a bit to further indicate types of branches other than conditional branches. For example, often a BTB entry will pertain to an unconditional branch such as CALL, RETURN, or JUMP. However, because these branches are unconditional, they are always predicted to occur. As demonstrated below, however, the present embodiments pertain more readily to conditional branch instructions which are sometimes predicted not taken. Nevertheless, in the preferred embodiment, $P_n$ is a three-bit field to indicate each of these alternative branch instructions, as follows:

| | | |
|---|---|---|
| 111 | conditional branch | Strongly Predicted Taken (ST) |
| 110 | conditional branch | Predicted Taken (T) |
| 101 | conditional branch | Predicted Not Taken (NT) |
| 100 | conditional branch | Strongly Predicted Not Taken (SNT) |
| 011 | CALL | |
| 010 | RETurn | |

-continued

| | |
|---|---|
| 001 | unconditional branch (JUMP) |
| 000 | invalid |

The states ST, T, NT, SNT for predicting the result of a conditional branch are indicative of the history of whether or not the conditional branch was, in fact, taken in past occurrences of the branch. A conditional branch instruction preferably obtains either a T or NT history upon its first execution; this history is stored in BTB 30 with the entry for that branch instruction. If the same result occurs in the next successive occurrence of the branch, the "strongly" states are entered; for example, if the entry predicts not taken, and the execution unit thereafter detects the branch is again not taken, the prediction for that branch instruction is updated frog not-taken to strongly not-taken. If a prediction field is set to a "strongly" state, the next opposite result moves the history information to the same state but without the strongly indication; for example, if an SNT branch is "taken", its history is changed to NT. Other examples are known in the art.

According to the preferred embodiment, each entry $30_n$ in BTB 56 also includes three additional fields corresponding to entry $30_n$: (1) a field designated $PPA_n$ which indicates a past prediction accuracy measure for past occurrences of the branch instruction (2) a field designated $TP_n$ which indicates whether the prediction $P_n$ should be followed; and (3) a field designated $CNTP_n$ which indicates a cost to taking a response to a branch instruction other than following the prediction. Each of these fields is discussed below.

$PPA_n$ indicates an accuracy measure for past predictions of the branch instruction. In other words, recall the prediction field $P_n$ represents a history of whether, in fact, past occurrences of the branch instruction were taken. In contrast, the past prediction accuracy field $PPA_n$ represents a history of whether past predictions of the branch instruction were accurate. The preferred use for this additional field is described later. However, at this point, a discussion of the preferred formats of $PPA_n$ is appropriate. Also, note that $PPA_n$ may be originated and updated in various manners, and the following represents a few preferred techniques. As a first example, returning briefly to FIG. 1, recall that the MISPREDICTED signal is communicated to BTB 30 by execute stage 26 (or some other circuit or stage which is able to determine whether the actual branch result matched the predicted branch result). Given this signal, in one embodiment, $PPA_n$ is a count which is incremented each time the MISPREDICTED signal indicates a correct prediction and which is decremented each time the MISPREDICTED signal indicates an incorrect prediction. Consequently, the higher the count of $PPA_n$, the more accurate the predictions recently have been for the corresponding branch instruction. Moreover, the greater the number of bits in the count, the greater the resolution in its indication. Indeed, other references exist to counting branch predictors, such as in "Combining Branch Predictors", by Scott McFarling, available from the Western Research Laboratory ("WRL"), Technical Note TN-36, June 1993, which is hereby incorporated herein by reference. In the preferred embodiment, a three-bit count is used so the count may reflect up to eight successive correct or incorrect predictions. As a second example, note also that the $PPA_n$ field may simply record the past states of the MISPREDICTED signal. For example, an eight-bit $PPA_n$ field could demonstrate in time fashion the last eight states of the MISPREDICTED signal. Thus, if three occurrences of a low MISPREDICTED signal (e.g., prediction accurate) were followed by five occurrences of a high MISPREDICTED signal (e.g., prediction inaccurate), then the eight-bit $PPA_n$ field would indicate 00011111. Thus, a field with more 1's than 0's would indicate a higher recent incidence of inaccurate branch prediction. In all events, these two examples as well as additional implementations will be appreciated by a person skilled in the art.

The value of $TP_n$ indicates whether the prediction represented by $P_n$ should be followed. More particularly, as demonstrated in FIGS. 3a through 4b, below, the present embodiments include a method flow which in some instances follow the prediction represented by $P_n$ in a manner similar to the prior art, but much unlike the prior art these embodiments further include instances which disregard the prediction represented by $P_n$ and instead respond to a branch instruction in an alternative manner (described later). The value of $TP_n$ is based on some function involving at least in part the past prediction accuracy, $PPA_n$, given the present embodiments. For example, the value of $TP_n$ may be derived from a function of $PPA_n$ which involves only the more prevalent direction of $PPA_n$. In other words, if $PPA_n$ favors past prediction accuracy better than a certain threshold, then $TP_n$ may be set such that the prediction of $P_n$ is followed. For example, if the threshold is fifty percent and $PPA_n$ is represented by a three-bit count greater then the binary count of 100, than $TP_n$ is set such that the prediction of $P_n$ is followed; conversely, if the three-bit count is less than or equal to the binary count of 100, then $TP_n$ is set such that the prediction of $P_n$ is disregarded and an alternative response to the branch instruction is taken. Note that the threshold may be selected by a person skilled in the art. Note further that other factors may influence the function which determines the state of $TP_n$, such as the third field $CNTP_n$ discussed below.

$CNTP_n$ indicates a cost of taking a response to a branch instruction other than following the prediction corresponding to that branch instruction. For example, as demonstrated below, in one embodiment an alternative response when incurring a branch instruction is to disregard $P_n$ (even if it predicts that the branch is taken) and, instead, to fetch a group of instructions sequentially following the branch instruction. As better appreciated below, however, this as well as other alternative responses may impose a cost on the system, that is, some type of penalty (e.g., lost clock cycles) if the alternative results in an improper or inefficient result. In any event, given the additional information provided by $CNTP_n$, it may be further combined in a function with the value of $PPA_n$ to determine the value of $TP_n$. For example, recall above the example of using only $PPA_n$ to determine the value of $TP_n$ with a threshold of fifty percent. Assume, now, however that the $PPA_n$ represents a value of only thirty-eight percent yet the cost represented by $CNTP_n$ is high. In this instance, the large potential cost from $CNTP_n$ may still justify accepting the prediction by $P_n$, even though $PPA_n$ is below fifty percent given the most recent occurrences of the branch instruction. In this instance, therefore, the function combining $CNTP_n$ and $PPA_n$ still causes $TP_n$ to indicate that the $P_n$ should be taken, even though $PPA_n$ is less than fifty percent. Moreover, the considerations factored into $CNTP_n$ as well as the function relating it to $PPA_n$ need not be limited and may be ascertained by a person skilled in the art.

Figure 3B:
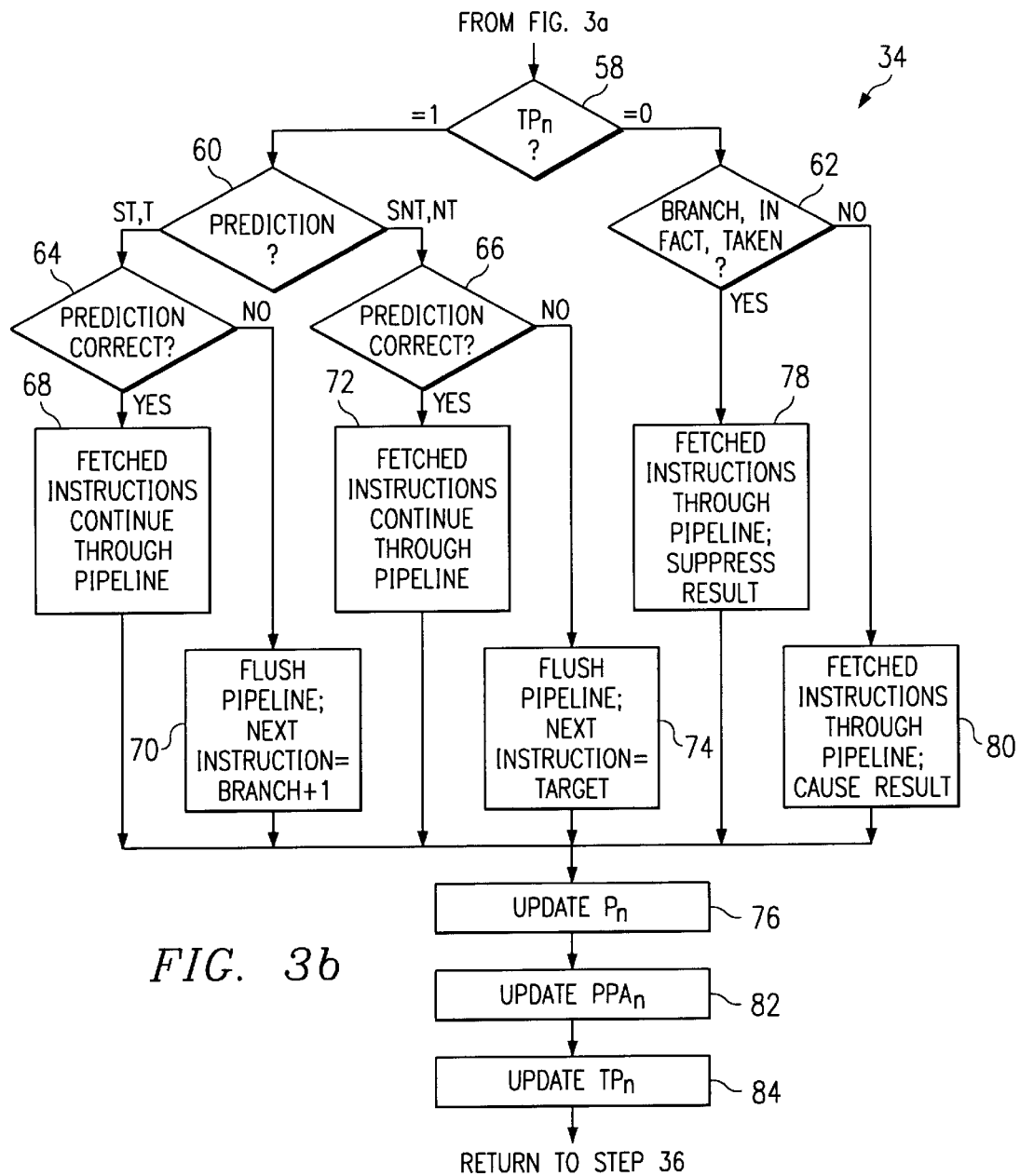
FIG. 3b illustrates a second portion of a method embodiment shown in a flowchart for instruction fetching, prediction, and predication in response to a branch instruction.

FIGS. 3a and 3b illustrate a flowchart of a method 34 of operation of system 10 of FIG. 1 for fetching instructions and responding to a branch instruction by fetching and passing additional instructions through pipeline 12. Before proceeding, note some preliminary observations. First, the steps of method 34 are not exhaustive, but only demonstrate operations to illustrate various aspects of the present embodiments; thus, additional operations may take place concurrently through differing stages of pipeline 12 as well as at other circuits located on the microprocessor including pipeline 12. Second, one skilled in the art will appreciate that some of the steps of method 34 may be re-ordered or occur concurrently rather than sequentially without departing from the intended inventive scope. Still further, to simplify the following discussion it is assumed for the sake of the examples that the particular branch instruction received and analyzed by method 34 has earlier been received and analyzed at least one time and, therefore, the BTB entry corresponding to that branch instruction (i.e., those fields shown in FIG. 2) have been written at least once if not updated subsequent times in the manner described below. Lastly, the steps of method 34 are directed, in part, to the effect of the $PPA_n$ field alone on the $TP_n$ field with the added effect of the $CNTP_n$ field deferred until FIG. 4b in order to simplify the current explanations. In all events, therefore, the steps of method 34 by way of illustration are as follows.

Step 36 of method 34 receives into pipeline 12 an instruction from an instruction sequence arranged in a typical sequential fashion. Note that the sequence arrangement is dictated by the order of the program code, but as known in the art, instruction fetching, decoding, execution, and other steps may be concurrent or even out of order. For example, several instructions actually may be fetched at once. Step 36, therefore, merely intends to depict that instructions are somehow retrieved and then each is analyzed according to the following steps.

Step 38 determines whether the instruction at issue is a branch instruction. This determination may be performed using known decoding techniques or BTB flags, etc. and, of course, will depend in part on the instruction set at issue. If the instruction at issue is not a branch instruction, the method returns to step 36 to receive the next instruction. On the other hand, if the instruction at issue is a branch instruction, method 34 continues to step 40.

Step 40 evaluates the value of $TP_n$ which previously has been set in response to some function involving at least $PPA_n$. If that value indicates the branch prediction is being followed (e.g., $TP_n=1$), the flow continues to step 46. On the other hand, if that value indicates the branch prediction is being disregarded (e.g., $TP_n=0$), the flow continues to step 54.

Turning now to the instance where branch prediction is being followed (e.g. $TP_n=1$), step 46 directs flow to either step 48 or step 50 based on the value of the BTB prediction field, $P_n$. If $P_n$ predicts the branch as taken (or strongly taken), the flow continues to step 48, whereas if $P_n$ predicts the branch as not taken (or strongly not taken), the flow continues to step 50. Step 48 causes instruction fetch stage 14 to fetch as the next instruction into pipeline 12 the instruction corresponding to the target address $D_n$ in BTB 30. Recall that actual address calculation and instruction retrieval may be accomplished with the assistance of instruction storage and address calculation circuit 32. Conversely, step 50 causes instruction fetch stage 14 to fetch as the next instruction into pipeline 12 the instruction sequentially following the branch instruction (shown as BRANCH+1 in step 50). In either case, after (or while) step 48 or 50 performs its fetch, the flow continues to step 52 discussed after the following discussion of step 54.

Turning now to the instance where branch prediction is being disregarded (e.g. $TP_n=0$), step 54 causes instruction fetch stage 14 to fetch as the next instruction into pipeline 12 the instruction sequentially following the branch instruction in the same manner as step 50. Thus, at this point, note that even though the prediction field $P_n$ may have predicted that the branch is to be taken, that prediction is disregarded such as in the example where the accuracy field $PPA_n$ is below a threshold; thus, the next fetched instruction is not the one corresponding to the address at $D_n$. The results and benefits from this alternative approach are better appreciated from the remaining discussion of FIGS. 3a and 3b.

Step 52 is included to demonstrate that the instructions fetched as of the current point continue through the various stages of pipeline 12. These instructions include the branch instruction as well as the instruction fetched after it (i.e., either the immediately sequential instruction or the target instruction). Note further that during the next steps described below, additional instructions following those already fetched and in pipeline 12 also may be fetched and pass through, albeit after, the instructions discussed immediately above. For example, if step 52 is reached from step 48, it represents the passage of the branch instruction, the target instruction, and a few instructions sequentially following the target instruction. As another example, if step 52 is reached from step 54, it represents the passage of the branch instruction, the instruction immediately following the branch instruction, and a few additional sequentially following instructions. The passage of these additional instructions through specific pipeline stages, however, is not further detailed as such a discussion is not necessary to demonstrate the present inventive embodiments.

Step 55 executes the branch instruction once it reaches the appropriate execution unit corresponding to execute stage 26. Note that execution of the branch instruction produces the ACTUAL TARGET ADDRESS shown in FIG. 1, that is, the execution determines whether the branch is, in fact, to be taken. Next, the flow continues to steps 56 through 84, but it should be understood that the actions of those steps preferably occur during the same clock cycle as the execution of the branch instruction. Thus, these additional steps 56 through 84 may be thought of as part of execute stage 26 or stages thereafter. In any event, step 56 determines whether the branch instruction was properly predicted, that is, it compares the ACTUAL TARGET ADDRESS with the predicted target address to establish the state of the MISPREDICTED signal. Next, step 58 again evaluates the value of $TP_n$ in the same manner as step 40, above. If that value indicates the branch prediction is being followed (e.g., $TP_n=1$), the flow continues to step 60. On the other hand, if that value indicates the branch prediction is being disregarded (e.g., $TP_n=0$), the flow continues to step 62.

Steps 60 through 74 by themselves operate in the same manner as the prior art in response to executing a branch instruction and potentially flushing the pipeline based on whether the branch instruction was properly predicted. Thus, these steps are briefly described here with the remaining detail available to a person skilled in the art. Step 60 causes flow to pass forward based on the prediction for the current branch instruction. If the branch is predicted taken (or strongly taken), the flow continues to step 64, whereas if the branch is predicted not taken (or strongly not taken), the flow continues to step 66. Steps 68 through 74 either allow the instructions to continue through pipeline 12 if the branch prediction is accurate, or cause a flush and new instruction fetch if the branch prediction is inaccurate. For example, returning to step 64, if the prediction is correct, the flow continues to step 68. In step 68, the fetched instruction (i.e., the target instruction) as well as those following it continue through pipeline 12 with no flush and refill, and the process continues to step 76 described later. As an opposite example from step 64, if the prediction is incorrect, the flow continues to step 70. In step 70, the fetched target instruction as well as those following it are flushed from (or invalidated in) pipeline 12, and instruction fetch stage 14 is notified to begin re-filling pipeline 12 beginning with the instruction immediately following the branch instruction. Again, thereafter, the flow continues to step 76 discussed later. The immediately preceding two examples occur in response to the determination of step 64. Step 66 operates in a similar fashion, but applies to the instance where the current prediction is not taken (or strongly not taken) as opposed to current prediction of taken (or strongly taken) which was the case above for step 64. Thus, with respect to step 66, if the prediction is correct, the flow continues to step 72 and, if the prediction is incorrect, the flow continues to step 74. Steps 72 and 74, respectively, either permit instructions to continue through, or flush instructions following the fetched instruction from, pipeline 12. Specifically, step 72 permits the fetched instruction (i.e., the next instruction following the branch instruction) to continue through pipeline 12 with no flush and refill, while in step 74 the fetched next instruction as well as those following it are flushed from (or invalidated in) pipeline 12, and instruction fetch stage 14 is notified to begin re-filling pipeline 12 beginning with the branch target instruction. After either step 72 or step 74, the flow continues to step 76 discussed later.

Returning to step 58, note now the steps following it if the value of $TP_n$ indicates the branch prediction is being disregarded (e.g., $TP_n=0$). Step 62 evaluates the determination (from step 55) of whether the branch is, in fact, taken. If the branch is, in fact, taken, the flow continues to step 78. If the branch is, in fact, not taken, the flow continues to step 80.

Given the above, step 78 is reached when the prediction, $P_n$, has been disregarded, the instruction(s) immediately following the branch instruction are fetched into pipeline 12, and it is later discovered (by execute stage 26) that the branch is, in fact, to be taken. Note, therefore, that at this point it is undesirable to allow at least some, if not all, of the instructions in pipeline 12 and following the branch instruction to complete and graduate. Indeed, recall that the prior art merely flushes and re-fills the pipeline when these types of instructions are found to be passing through the pipeline after the branch instruction. In contrast to the prior art, however, step 78 allows these instructions to pass fully through pipeline 12, but suppresses the result of any of those instructions. In general, for each subsequent instruction between the branch instruction and the target instruction (referred to hereafter as "intermediary instructions"), step 78 guides the microprocessor to suppress the result of each intermediary instruction. In other words, the results of the intermediary instructions are suppressed and, therefore, effectively act as no operations (so-called no-ops) as they pass through pipeline 12. Such suppression may take place, for example, by not executing the instruction, by not writing its result, by not graduating it, or by taking any other action so that the instruction may pass through pipeline 12 but have no other affect on program flow or on the architected state of the microprocessor. Thus, although the instructions at issue pass fully through the pipeline, the architected portion of the processor does not see a result. Thus, even in the instance of a no-op instruction, the architected program counter would not increment if the result of this no-op instruction were suppressed.

Note from the above discussion that step 78 suppresses the results of those intermediary instructions then in pipeline 12. Note further, however, that the above discussion therefore assumes that the target instruction is one of those instructions already fetched into pipeline 12 and, therefore, suppression is of those instructions between the branch instruction and the target instruction (i.e., the intermediary instructions). In some instances, however, the number of intermediary instructions may be sufficiently large such that the target instruction has not yet been fetched into pipeline 12 as of the time step 78 is to occur. In this event, rather than suppressing the results of those already-fetched intermediary instructions and allowing them to pass through pipeline 12, in the preferred embodiment pipeline 12 is flushed and the next instruction to be fetched into pipeline 12 is the target instruction (i.e., in the same manner as described above with respect to step 74). In any event, the flow then continues to step 76.

Given the above, one skilled in the art should appreciate that step 78 in some instances allows instructions to pass through pipeline 12 without always requiring the inefficient flush and refill operations required in the prior art. The specific techniques for result suppression may be accomplished based on the above. Moreover, for additional detail regarding result suppression of intermediary instructions, the reader is invited to review U.S. Provisional Patent Application 60/008,166, entitled "Microprocessor With Improved Branch Instruction Execution Circuits, Systems, And Methods", filed Oct. 31, 1995, with inventors Jonathan H. Shiell and James O. Bondi, assigned to the same assignee of the present patent application, and which is hereby incorporated herein by reference. The referenced Patent Application 60/008,166 discusses various techniques for result suppression. For example, one such technique adds one or more bits to instructions as they pass through the pipeline with those bits to indicate whether the result of the instruction should be suppressed. As another example, an alternative technique counts each intermediary instruction as it passes through the pipeline and suppresses its result until each intermediary instruction has been counted, so that the next instruction following the intermediary instructions (i.e., the target instruction) exceeds the given count and, therefore, its result is not suppressed and instead is allowed to occur. Note further that while the referenced Patent Application 60/008,166 discusses result suppression and causation in the context of short forward branch instructions, the same concepts apply to the branch instructions in the present document and which are not limited solely to short forward branch instructions but which may instead include other types of conditional branch instructions. Lastly, note that after step 78, the flow continues to step 76 discussed later.

Turning now to step 80, note that it is reached when the prediction, $P_n$, has been disregarded, the instruction(s) immediately following the branch instruction are fetched into pipeline 12, and it is later discovered (by execute stage 26) that the branch is, in fact, not to be taken. Given this history, because no branch is to be taken, then the instructions already fetched into pipeline 12 are those which should follow the branch instruction. Thus, step 80 simply allows those already-fetched instructions to continue through pipeline 12, and the results of those instructions are not affected or suppressed as they are in the alternative case of step 78 described above. In other words, those instructions continue through each stage of pipeline 12 including graduate/writeback stage 28 and, therefore, complete their intended affect on the architected state of the microprocessor. Lastly, note that after step 80, the flow continues to step 76 discussed immediately below.

Steps 76, 82, and 84 update earlier information in BTB 30 based on the most recent occurrence of a given branch instruction. Specifically, step 76 updates $P_n$ in the appropriate entry of BTB 30 to either change or keep that history at a level causing a prediction of strongly taken, taken, not taken, or strongly not taken. This action is preferably taken in the same manner as in the prior art. In other words, the actual branch determination from step 55 is used to modify, or maintain, the prediction based on the most recent execution of the branch instruction, such as changing a prediction from a strongly taken or strongly not taken, to a taken or not taken, respectively and as detailed above. With respect to step 82, recall from FIG. 1 that the resulting MISPREDICTED signal from step 56 is communicated to BTB 30 of instruction fetch stage 14. Thus, step 82 uses this new information to update the past prediction accuracy $PPA_n$ in response to the MISPREDICTED signal. For example, if the three-bit count described above is used for $PPA_n$, then the count is either incremented or decremented in response to the level of the MISPREDICTED signal. Step 84 updates the value of $TP_n$ to be used by the next analysis of method 34 for the current branch instruction. The preferred techniques for analyzing $TP_n$ are discussed below in connection with FIGS. 4a and 4b. Once step 84 is complete, the flow returns to step 36 where method 34 may once again detect and respond to a branch instruction.

Figure 4A:
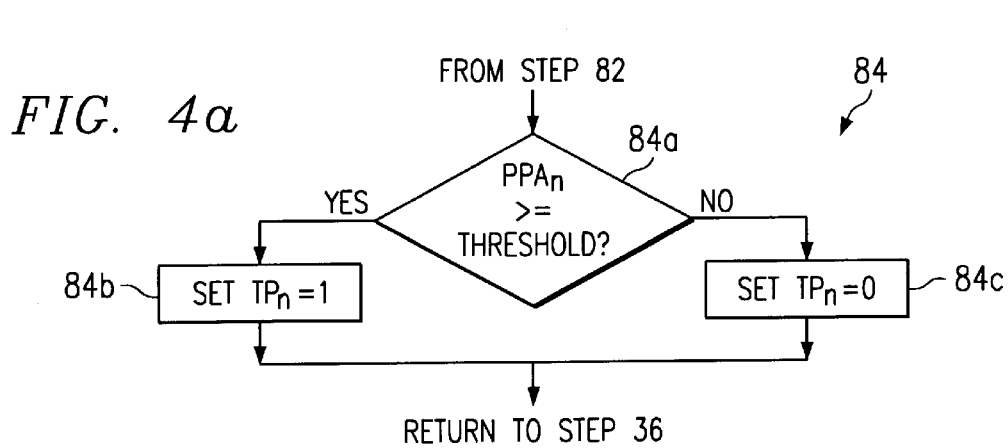
FIG. 4a illustrates a method embodiment for comparing past prediction accuracy to a threshold to determine whether or not the prediction field should be used to control the response to a branch instruction.

FIG. 4a illustrates one embodiment for updating $TP_n$ of step 84 shown in FIG. 3b, above. Specifically, recall from the above that in the preferred embodiments $TP_n$ is determined from a function involving, or responsive to, at least the past prediction accuracy, $PPA_n$. For example, the function applied by step 84a to $PPA_n$ is to determine whether the representation (e.g., three-bit count) alone is equal to or greater than a threshold. For example, recall from above an example of such a threshold of fifty percent. Thus, in the current example, if $PPA_n$ exceeds this (or another) threshold, the flow continues to step 84b which sets $TP_n$ to a state (e.g., logic 1) such that the prediction field $P_n$ directs the method flow from step 46 forward as described above. On the other hand, if $PPA_n$ does not exceed the threshold, the flow continues to step $84_c$ which sets $TP_n$ to a state (e.g., logic 0) opposite that of step 42, and that opposite setting indicates that the prediction field $P_n$ is disregarded and instead the steps including and following step 54 are used to direct the method flow as described above. Returning now to step 40 of FIG. 3a, it is appreciated how the next encounter of the present branch instruction will be handled in view of the current setting of $TP_n$. Specifically, in the current example, if the prediction accuracy is above or equal to the threshold, the flow continues to step 46 which further flows to either step 48 or step 50, whereas if the prediction accuracy is below the threshold, the flow continues to step 54. Lastly, note that a person skilled in the art may also adjust the magnitude of the threshold, and also could change the greater or equal to condition of step 84a to simply greater than the threshold.

Figure 4B:
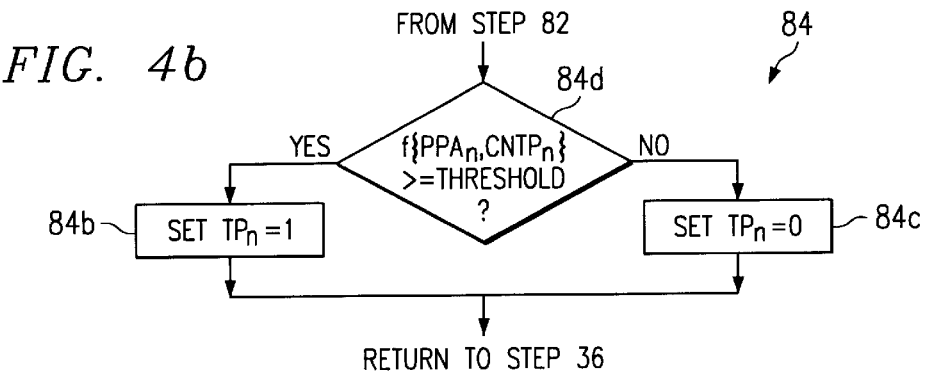
FIG. 4b illustrates a method embodiment for comparing a function combining past prediction accuracy and a cost factor to a threshold to determine whether or not the prediction field should be used to control the response to a branch instruction.

FIG. 4b is a partial reproduction of FIG. 4a, where a new step 84d is substituted for step 84a shown in FIG. 4a. Thus, FIG. 4b demonstrates an alternative method for updating $TP_n$. Looking then to step 84d, note that it again includes a function which relies at least, on the value of PPA$n$. However, the function responding to $PPA_n$ in step 84d further combines the effect of $CNTP_n$ when setting $TP_n$ (and therefore the combined effect determines whether to adhere to $P_n$ (i.e., step 46 and those following it) or whether to disregard $P_n$ (i.e., step 54 and those steps following it)). Particularly, recall from above that in one embodiment BTB 30 may further include $CNTP_n$ as a cost of taking a response to a branch other than following the prediction. For example, steps 62, 78, and 80 demonstrate an alternative to following a branch prediction, where that alternative is allowing all intermediary instructions to pass through pipeline 12, with the risk that each intermediary instruction was actually unnecessarily fetched. In other words, if the prediction is taken and indeed it is accurate, then it was unnecessary to fetch the intermediary instructions into pipeline 12. However, if that same prediction is disregarded by step 40 and later step 58, then the intermediary instructions were fetched into pipeline 12 whereas they would not have been had the prediction been followed. As a result, one skilled in the art will appreciate examples where the cost for such an action may be higher for some branch instructions over others. For example, a branch instruction with a relatively larger number of intermediary instructions following it could likely have a larger cost than one with a lesser number of intermediary instructions following it. Given this additional cost, step 84d illustrates that the effect of $PPA_n$ may be further combined by some function to take into account both the magnitude of $PPA_n$ when considered in view of the value of the cost factor $CNTP_n$. Note that the actual function and significance attributed both $PPA_n$ and $CNTP_n$ may be selected and modified by a person skilled in the art. Once a result from that function is reached, step $84_d$ compares the result of the function to a given threshold, and if the result is greater than or equal to the threshold the flow continues to step 84b to set $TP_n$ to one, whereas if the result is less than the threshold the flow continues to step 84c to set $TP_n$ to zero. Again, therefore, returning to step 40 in FIG. 3a, the setting of $TP_n$, as affected by the function of both $PPA_n$ and $CNTP_n$, ultimately indicates whether the flow should continue either to step 42 or to step 44.

Figure 5:
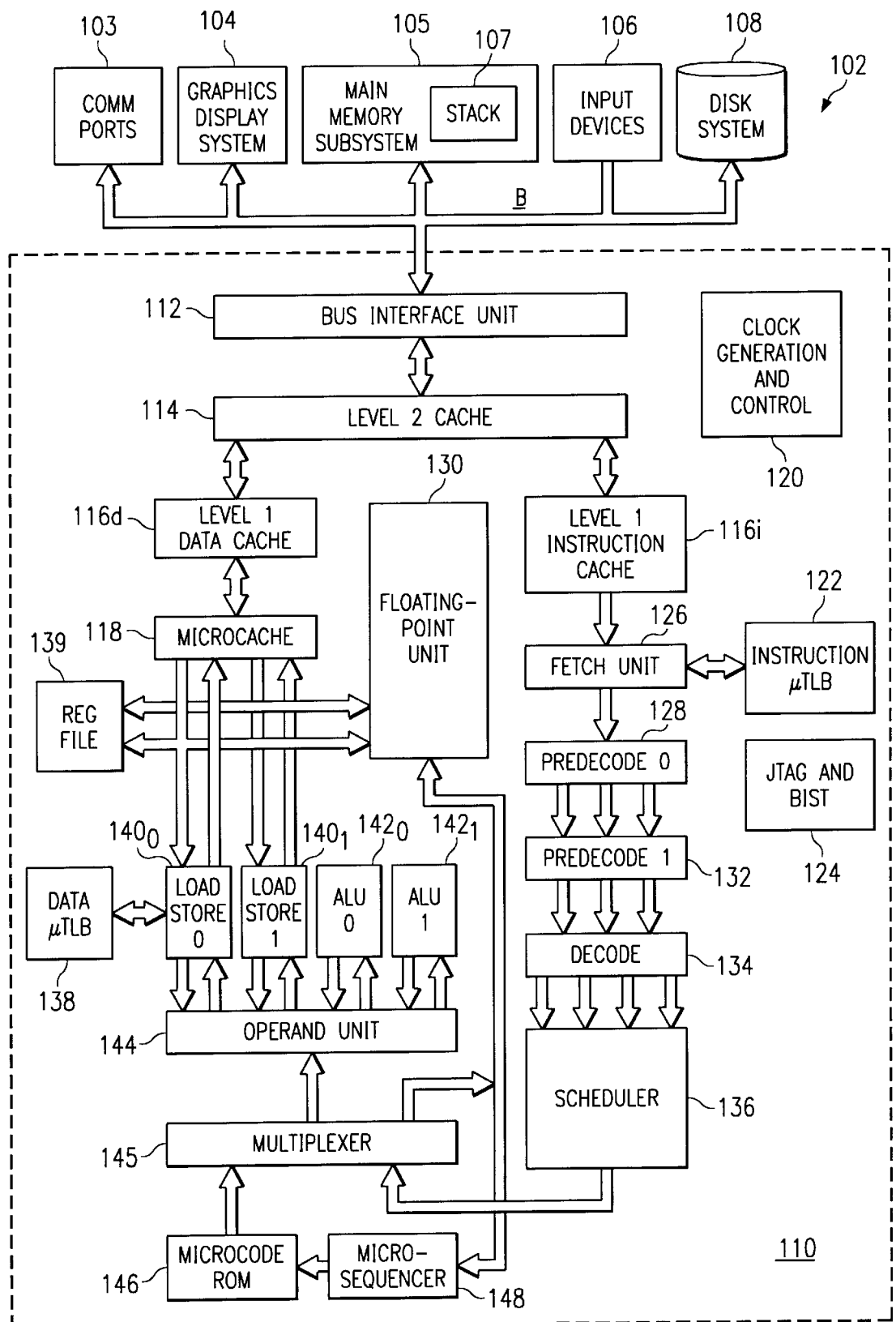
FIG. 5 illustrates an exemplary data processing system within which the preferred embodiments may be implemented.

Having described the above embodiments, FIG. 5 illustrates a block diagram of a microprocessor embodiment into which the above embodiments may be incorporated. Referring now to FIG. 5, an exemplary data processing system 102, including an exemplary superscalar pipelined microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 110, as shown in FIG. 5, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD-ROM drives). It is therefore contemplated that system 102 of FIG. 5 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit ("BIU") 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 5, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114. Of course, microprocessor 110 may also effect bus traffic around level 2 cache 114, by treating certain bus reads and writes as "not cacheable". Level 2 cache 114, as shown in FIG. 5, is connected to two level 1 caches 116; level 1 data cache $116_d$ is dedicated to data, while level 1 instruction cache $116_i$ is dedicated to instructions. Power consumption by microprocessor 110 is minimized by accessing level 2 cache 114 only in the event of cache misses of the appropriate one of the level 1 caches 116. Furthermore, on the data side, microcache 118 is provided as a level 0 cache, which in this example is a fully dual-ported cache.

As shown in FIG. 5 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $142_0$, $142_2$ for processing conditional branch, integer, and logical operations, floating-point unit (FPU) 130, two load-store units $140_0$, $140_1$, and microsequencer 148. The two load-store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple pipelines with seven stages each, with write back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |

-continued

| | |
|---|---|
| SC | Schedule: This stage assigns up to four AOps to the appropriate execution units |
| OP | Operand: This stage retrieves the register and/or memory operands indicated by the AOps |
| EX | Execute: This stage runs the execution units according to the AOps and the retrieved operands |
| WB | Write back: This stage stores the results of the execution in registers or in memory |

Referring back to FIG. 5, the pipeline stages noted above are performed by various functional blocks within microprocessor 110. Fetch unit 126 generates instruction addresses from the instruction pointer, by way of instruction micro-translation lookaside buffer ($\mu$TLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution, As indicated in FIG. 5, operand unit 144 receives an input from scheduler 136 and also from microcode ROM 148, via multiplexer 145, and fetches register operands for use in the execution of the instructions. In addition, according to this example, operand unit 144 performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 5, as well as the descriptions above such as those relating to the prior Figures, one skilled in the art may appreciate that system 34 of FIG. 1 may be incorporated in connection with various components shown in FIG. 5. For example, fetch unit 126 may be used in place of instruction fetch stage 14, with instruction storage and address calculation circuit 32 being approximated by level 1 instruction cache 116$_i$ and instruction micro-translation lookaside buffer ($\mu$TLB) 122. Still other stages may be substituted, such that predecode 0 stage 128, predecode 1 stage 132, decode 134, and scheduler 136 may be used in place of stages 14 through 22 of system 10. As another example, operand unit 144 may be used as operand fetch stage 24. As another example, the various execution units (e.g., ALU0 142$_0$, ALU1 142$_1$, load store 0 140$_0$, load store 1 140$_1$, and floating point unit 130) of FIG. 5 may represent execute stage 26. Still further, various related functionality may be further performed by the appropriate circuitry within FIG. 5.

From the above, one skilled in art may appreciate various benefits of the present embodiments. For example, a microprocessor in accordance with the various embodiments may efficiently handle branch mispredictions with a reduced amount of clock cycle delay. As another example, benefits of branch prediction are realized in certain instances while benefits of alternative approaches to branch handling (e.g., predication) may be realized for less predictable branch instructions. As another example, the pipeline stages set forth above are by way of example and more, less, or alternative stages could be used. As yet another example, while the microprocessor of FIG. 5 depicts an exemplary microprocessor to benefit from the inventive embodiments, other microprocessor architectures could benefit as well. Indeed, these benefits and examples serve further to demonstrate that while the present embodiments have been described in detail, various substitutions, modifications or alterations could be made to the descriptions set forth above without departing from the inventive scope. Thus, in addition to the many options set forth above still other alternatives will be ascertainable by a person skilled in the art, and all of the above demonstrates the flexibility of the inventive scope which is defined by the following claims.

What is claimed is:

1. A microprocessor, comprising:
    an execution stage comprising a plurality of execution units;
    an instruction memory for storing instructions; and
    circuitry for retrieving instructions from the instruction memory, said circuitry for retrieving instructions operating to retrieve a second instruction simultaneously with the execution of a first instruction by one of said plurality of execution units, said circuitry for retrieving instructions comprising:
        a branch target memory for storing a plurality of information fields corresponding to a branch instruction, wherein said plurality of information fields comprise:
            a target instruction address;
            a prediction field indicating whether or not program flow should pass to said target instruction address; and
            an accuracy measure indicating accuracy of past ones of said prediction field;
    wherein said circuitry for retrieving instructions retrieves, as a next instruction to follow said branch instruction, an instruction corresponding to said target instruction address in response to a function responsive to said accuracy measure exceeding a predetermined threshold and said prediction field indicating program flow should pass to said target instruction address; and
    wherein said circuitry for retrieving instructions retrieves, in response to said function responsive to said accuracy measure not exceeding a predetermined threshold, a first group of instructions, wherein said first group of instructions is sequentially arranged after said branching branch instruction and includes an instruction corresponding to said target instruction address.

2. The microprocessor of claim 1:
    wherein each instruction in said first group of instructions is operable for causing a result, and further comprising:
        circuitry for determining whether or not program flow should pass to said target instruction address in response to said branch instruction;
        circuitry for passing each first group instruction fully through said execution stage; and
        circuitry for suppressing the result of each first group instruction other than said instruction corresponding to said target instruction address in response to determining that program flow should pass to said target instruction address in response to said branch instruction.

3. The microprocessor of claim 2 wherein said execution stage comprises said circuitry for determining whether or not program flow should pass to said target instruction address in response to said branch instruction.

4. The microprocessor of claim 1:
    wherein each instruction in said first group of instructions is operable for causing a result, and further comprising:
        circuitry for determining whether or not program flow should pass to said target instruction address in response to said branch instruction;
        circuitry for passing each first group instruction fully through said execution stage; and
        circuitry for causing the result of each first group instruction in response to determining that program flow should not pass to said target instruction address in response to said branch instruction.

5. The microprocessor of claim 4 wherein said execution stage comprises said circuitry for determining whether or not program flow should pass to said target instruction address in response to said branch instruction.

6. The microprocessor of claim 1 wherein said circuitry for retrieving instructions retrieves, as a next instruction to follow said branch instruction, an instruction sequentially following said branch instruction in response to said function responsive to said accuracy measure exceeding a predetermined threshold and said prediction field indicating program flow should not pass to said target instruction address.

7. The microprocessor of claim 1 wherein said plurality of information fields further comprise a cost factor for representing a cost to disregard said prediction field.

8. The microprocessor of claim 7:
    wherein said function responsive to said accuracy measure is further responsive to said cost factor; and
    wherein said circuitry for retrieving instructions retrieves, as a next instruction to follow said branch instruction, an instruction corresponding to said target instruction address in response to said function responsive to said accuracy measure and said cost factor exceeding a predetermined threshold and said prediction field indicating program flow should pass to said target instruction address.

9. The microprocessor of claim 7:
wherein said function responsive to said accuracy measure is further responsive to said cost factor; and
wherein said circuitry for retrieving instructions retrieves, as a next instruction to follow said branch instruction, an instruction sequentially following said branch instruction in response to said function responsive to said accuracy measure and said cost factor exceeding a predetermined threshold and said prediction field indicating program flow should not pass to said target instruction address.

10. The microprocessor of claim 7:
wherein said function responsive to said accuracy measure is further responsive to said cost factor; and
wherein said circuitry for retrieving instructions retrieves, in response to said function responsive to said accuracy measure and said cost factor not exceeding a predetermined threshold, a first group of instructions, wherein said first group of instructions is sequentially arranged after said branching branch instruction and includes an instruction corresponding to said target instruction address.

11. The microprocessor of claim 1 and further comprising circuitry for indicating whether or not said prediction field is accurate, and wherein said accuracy measure comprises a count responsive to said circuitry for indicating whether or not said prediction field is accurate.

12. The microprocessor of claim 11:
wherein said count is incremented in response to said circuitry for indicating whether or not said prediction field is accurate indicating said prediction field is accurate; and
wherein said count is decremented in response to said circuitry for indicating whether or not said prediction field is accurate indicating said prediction field is not accurate.

13. The microprocessor of claim 1 and further comprising circuitry for indicating whether or not said prediction field is accurate, and wherein said accuracy measure comprises a history of past indications by said circuitry for indicating whether or not said prediction field is accurate.

14. The microprocessor of claim 1 wherein said plurality of information fields further comprise a field responsive to said function responsive to said accuracy measure exceeding a predetermined threshold to indicate whether said prediction field should be followed.

15. The microprocessor of claim 1:
wherein said plurality of information fields further comprise a cost factor for representing a cost to disregard said prediction field;
wherein said function responsive to said accuracy measure is further responsive to said cost factor; and
wherein said plurality of information fields further comprise a field responsive to said function responsive to said accuracy measure and said cost factor exceeding a predetermined threshold and for indicating whether or not said prediction field should be followed.

16. The microprocessor of claim 1 wherein said prediction field directly indicates whether program flow should pass to said target instruction address.

17. The microprocessor of claim 1 wherein said prediction field addresses a secondary table, wherein an entry from said secondary table indicates whether program flow should pass to said target instruction address.

18. A microprocessor, comprising:
an execution stage comprising a plurality of execution units;
an instruction memory for storing instructions; and
circuitry for retrieving instructions from the instruction memory, said circuitry for retrieving instructions operating to retrieve a second instruction simultaneously with the execution of a first instruction by one of said plurality of execution units, said circuitry for retrieving instructions comprising:
a branch target memory for storing a plurality of information fields corresponding to a branch instruction, wherein said plurality of information fields comprise:
a target instruction address;
a prediction field indicating whether or not program flow should pass to said target instruction address; and
an accuracy measure indicating accuracy of past ones of said prediction field;
wherein said circuitry for retrieving instructions retrieves, as a next instruction to follow said branch instruction, an instruction corresponding to said target instruction address in response to a function responsive to said accuracy measure exceeding a predetermined threshold and said prediction field indicating program flow should pass to said target instruction address;
wherein said circuitry for retrieving instructions retrieves, in response to said function responsive to said accuracy measure not exceeding a predetermined threshold, a first group of instructions, wherein said first group of instructions is sequentially arranged after said branching branch instruction and includes an instruction corresponding to said target instruction address;
wherein each instruction in said first group of instructions is operable for causing a result, and further comprising:
circuitry for determining whether or not program flow should pass to said target instruction address in response to said branch instruction;
circuitry for passing each first group instruction fully through said execution stage;
circuitry for suppressing the result of each first group instruction other than said instruction corresponding to said target instruction address in response to determining that program flow should pass to said target instruction address in response to said branch instruction;
circuitry for causing the result of each first group instruction in response to determining that program flow should not pass to said target instruction address in response to said branch instruction; and
wherein said circuitry for retrieving instructions retrieves, as a next instruction to follow said branch instruction, an instruction sequentially following said branch instruction in response to said function responsive to said accuracy measure exceeding a predetermined threshold and said prediction field indicating program flow should not pass to said target instruction address.

19. The microprocessor of claim 18 wherein said plurality of information fields further comprise a cost factor for representing a cost to disregard said prediction field.

20. The microprocessor of claim 19:

wherein said function responsive to said accuracy measure is further responsive to said cost factor; and wherein said circuitry for retrieving instructions retrieves, as a next instruction to follow said branch instruction, an instruction corresponding to said target instruction address in response to said function responsive to said accuracy measure and said cost factor exceeding a predetermined threshold and said prediction field indicating program flow should pass to said target instruction address.

21. The microprocessor of claim 19:

wherein said function responsive to said accuracy measure is further responsive to said cost factor; and wherein said circuitry for retrieving instructions retrieves, as a next instruction to follow said branch instruction, an instruction sequentially following said branch instruction in response to said function responsive to said accuracy measure and said cost factor exceeding a predetermined threshold and said prediction field indicating program flow should not pass to said target instruction address.

22. The microprocessor of claim 19:

wherein said function responsive to said accuracy measure is further responsive to said cost factor; and wherein said circuitry for retrieving instructions retrieves, in response to said function responsive to said accuracy measure and said cost factor not exceeding a predetermined threshold, a first group of instructions, wherein said first group of instructions is sequentially arranged after said branching branch instruction and includes an instruction corresponding to said target instruction address.

23. The microprocessor of claim 19:

wherein said function responsive to said accuracy measure is further responsive to said cost factor;

wherein said circuitry for retrieving instructions retrieves, as a next instruction to follow said branch instruction, an instruction corresponding to said target instruction address in response to said function responsive to said accuracy measure and said cost factor exceeding a predetermined threshold and said prediction field indicating program flow should pass to said target instruction address;

wherein said circuitry for retrieving instructions retrieves, as a next instruction to follow said branch instruction, an instruction sequentially following said branch instruction in response to said function responsive to said accuracy measure and said cost factor exceeding a predetermined threshold and said prediction field indicating program flow should not pass to said target instruction address; and wherein said circuitry for retrieving instructions retrieves, in response to said function responsive to said accuracy measure and said cost factor not exceeding a predetermined threshold, a first group of instructions, wherein said first group of instructions is sequentially arranged after said branching branch instruction and includes an instruction corresponding to said target instruction address.

24. The microprocessor of claim 18 wherein said plurality of information fields further comprise a field responsive to said function responsive to said accuracy measure exceeding a predetermined threshold to indicate whether said prediction field should be followed.

25. The microprocessor of claim 18:

wherein said plurality of information fields further comprise a cost factor for representing a cost to disregard said prediction field;

wherein said function responsive to said accuracy measure is further responsive to said cost factor; and wherein said plurality of information fields further comprise a field responsive to said function responsive to said accuracy measure and said cost factor exceeding a predetermined threshold and for indicating whether or not said prediction field should be followed.

26. A method of operating a microprocessor wherein the microprocessor stores a plurality of information fields corresponding to a branch instruction, wherein said plurality of information fields comprise a target instruction address and a prediction field indicating whether or not program flow should pass to said target instruction address, the method comprising the steps of:

fetching a branch instruction into a pipeline;

fetching a next instruction to follow said branch instruction into said pipeline, wherein said step of fetching a next instruction comprises:

fetching a target instruction corresponding to a target instruction address in response to a function responsive to an accuracy measure exceeding a predetermined threshold and a prediction field corresponding to the branch instruction indicating program flow should pass to said corresponding target instruction address, wherein said accuracy measure indicates accuracy of past predictions corresponding to the branch instruction and wherein said prediction field is not a function of said accuracy measure; and fetching a first group of instructions, wherein said first group of instructions is sequentially arranged after said branching branch instruction and includes an instruction corresponding to said target instruction address, in response to said function responsive to said accuracy measure not exceeding a predetermined threshold.

27. The method of claim 26, wherein each instruction in said first group of instructions is operable for causing a result, and further comprising:

determining whether or not program flow should pass to said target instruction address in response to said branch instruction;

passing each first group instruction fully through an execution stage in said pipeline; and suppressing the result of each first group instruction other than said instruction corresponding to said target instruction address in response to determining that program flow should pass to said target instruction address in response to said branch instruction.

28. The method of claim 26, wherein each instruction in said first group of instructions is operable for causing a result, and further comprising:

determining whether or not program flow should pass to said target instruction address in response to said branch instruction;

passing each first group instruction fully through an execution stage in said pipeline; and causing the result of each first group instruction in response to determining that program flow should not pass to said target instruction address in response to said branch instruction.

29. The method of claim 26:

wherein said function responsive to said accuracy measure is further responsive to a cost factor;

wherein said cost factor represents a cost to disregard said prediction field; and wherein said step of fetching a target instruction corresponding to a target instruction address in response to a function responsive to an accuracy measure exceeding a predetermined threshold and a prediction field corresponding to the branch instruction indicating program flow should pass to a corresponding target instruction address further comprises fetching a target instruction corresponding to a target instruction address in response to said function responsive to an accuracy measure and said cost factor exceeding a predetermined threshold and said prediction field corresponding to the branch instruction indicating program flow should pass to a corresponding target instruction address.

30. The method of claim 26:

wherein said function responsive to said accuracy measure is further responsive to a cost factor;

wherein said cost factor represents a cost to disregard said prediction field; and wherein said step of fetching a first group of instructions in response to said function responsive to said accuracy measure not exceeding a predetermined threshold further comprises fetching said first group of instructions in response to said function responsive to said accuracy measure and said cost factor not exceeding a predetermined threshold.

* * * * *